(12) United States Patent
Rodionov et al.

(10) Patent No.: US 12,537,815 B2
(45) Date of Patent: Jan. 27, 2026

(54) AUTHORIZATION OF MULTIPLE USER IDENTITIES

(71) Applicant: Lenovo (Singapore) Pte. Ltd., Singapore (SG)

(72) Inventors: Sergei Rodionov, Plano, TX (US); Igor Stolbikov, Apex, NC (US); Scott Li, Cary, NC (US); Rod D Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 153 days.

(21) Appl. No.: 18/508,850

(22) Filed: Nov. 14, 2023

(65) Prior Publication Data
US 2025/0158977 A1  May 15, 2025

(51) Int. Cl.
*H04L 9/40* (2022.01)
(52) U.S. Cl.
CPC .......... *H04L 63/083* (2013.01); *H04L 63/105* (2013.01)
(58) Field of Classification Search
CPC ..................... H04L 63/083; H04L 63/105
USPC ................................................... 726/4
See application file for complete search history.

(56) References Cited

U.S. PATENT DOCUMENTS

| 8,752,154 | B2* | 6/2014 | Kelley | H04L 9/3215 |
| | | | | 726/8 |
| 8,769,651 | B2* | 7/2014 | Grajek | H04L 63/0815 |
| | | | | 726/8 |
| 2012/0023556 | A1* | 1/2012 | Schultz | G06F 21/41 |
| | | | | 726/8 |
| 2025/0023860 | A1* | 1/2025 | Parla | H04L 63/0815 |
| 2025/0030552 | A1* | 1/2025 | Crabtree | H04L 9/3213 |

OTHER PUBLICATIONS

A Decentralised Digital Token Architecture for Public Transport, Oscar et al., Dec. 2020 (Year: 2020).*

* cited by examiner

*Primary Examiner* — Jahangir Kabir
(74) *Attorney, Agent, or Firm* — Schwegman Lundberg & Woessner, P.A.

(57) ABSTRACT

An apparatus can include an interface for receiving validation requests of a user. The apparatus can include processing circuitry coupled to the interface. The processing circuitry can receive a first validation request, the first validation request including a first virtual identity. The processing circuitry can provide, over the interface, a primary token responsive to validating the first virtual identity. The processing circuitry can provide the primary token upon validating that the subsequent validation requests correspond to the user responsive to receiving subsequent validation requests.

20 Claims, 5 Drawing Sheets

AUTHORIZATION OF MULTIPLE USER IDENTITIES

TECHNICAL FIELD

Embodiments described herein generally relate to user authentication, and in an embodiment, but not by way of limitation, to single-point authentication of multiple user identities.

BACKGROUND

Many people today own at least two electronic devices. Users may need to provide separate authentication to access each device, and sometimes each device requires more than one authentication to access different applications. Furthermore, different devices may use different operating systems or platforms, and one device that uses one platform may not necessarily facilitate communication to a different device that uses a different platform. There is a general need for a system that facilitates authentication of a user identity across many operating systems and environments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
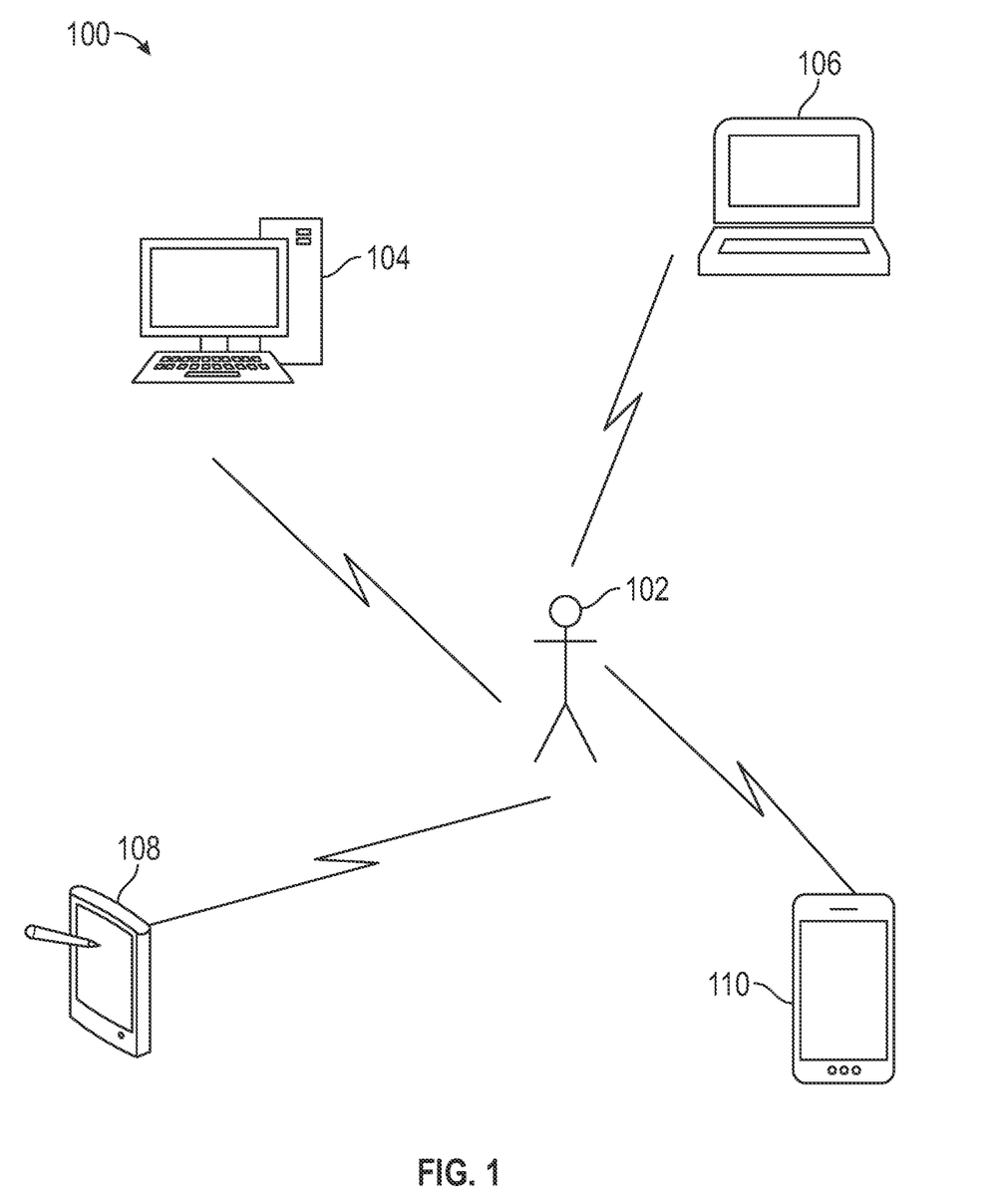
FIG. 1 illustrates a system in which example embodiments can be implemented.

Today, many people own several electronic devices. These several devices can each run on different operating systems or platforms. For example, FIG. 1 illustrates a system 100, in which user 102 owns and operates a desktop computer 104, a laptop 106, a tablet computer 108 and a smart phone 110. At least one of the desktop computer 104, laptop 106, tablet computer 108 or smart phone 110 can operate using a different operating system than the other devices shown in system 100. The operating system provider on each device in system 100 may request identity management before the user 102 can use the respective device. Sometimes users also have personal accounts and work accounts for each device or for each operating system.

These different requirements can result in a computer ecosystem in which a user 102 has to remember multiple sets of account information and login information. It also becomes difficult to build cross-device solutions because of the variability in operating systems/platforms. Apparatuses and methods according to example embodiments address these concerns by providing a primary or main identity that maps to various separate virtual identities as described below. This primary or main identity allows users to maintain a single identity across all devices.

Apparatuses and methods according to embodiments can securely link multi-device identity management schema. In embodiments, a user can log on to different devices each potentially with a different identity system, and the processing circuitry of example apparatuses will map the different identities/logins to a single unified identity. Thereafter, using the systems and apparatuses described herein, the user can login using many disparate identities and be recognized, without having to remember and enter multiple sets of user names, passwords, or authentication information.

Systems according to some embodiments can perform validation of device tokens or other tokens and exchange these tokens for a main or primary identity/token using a centralized identity exchange service. According to some method examples described below, different identities and tokens can be accepted or converted, including (but not limited to) Open Authorization (OAuth) tokens, Security Assertion Markup Language (SAML) tokens, Kerberos tickets, etc. Methods according to embodiments allow the identities on multiple devices to be linked together enabling multiple devices to work as one and to securely and seamlessly communicate among each other.

Figure 2:
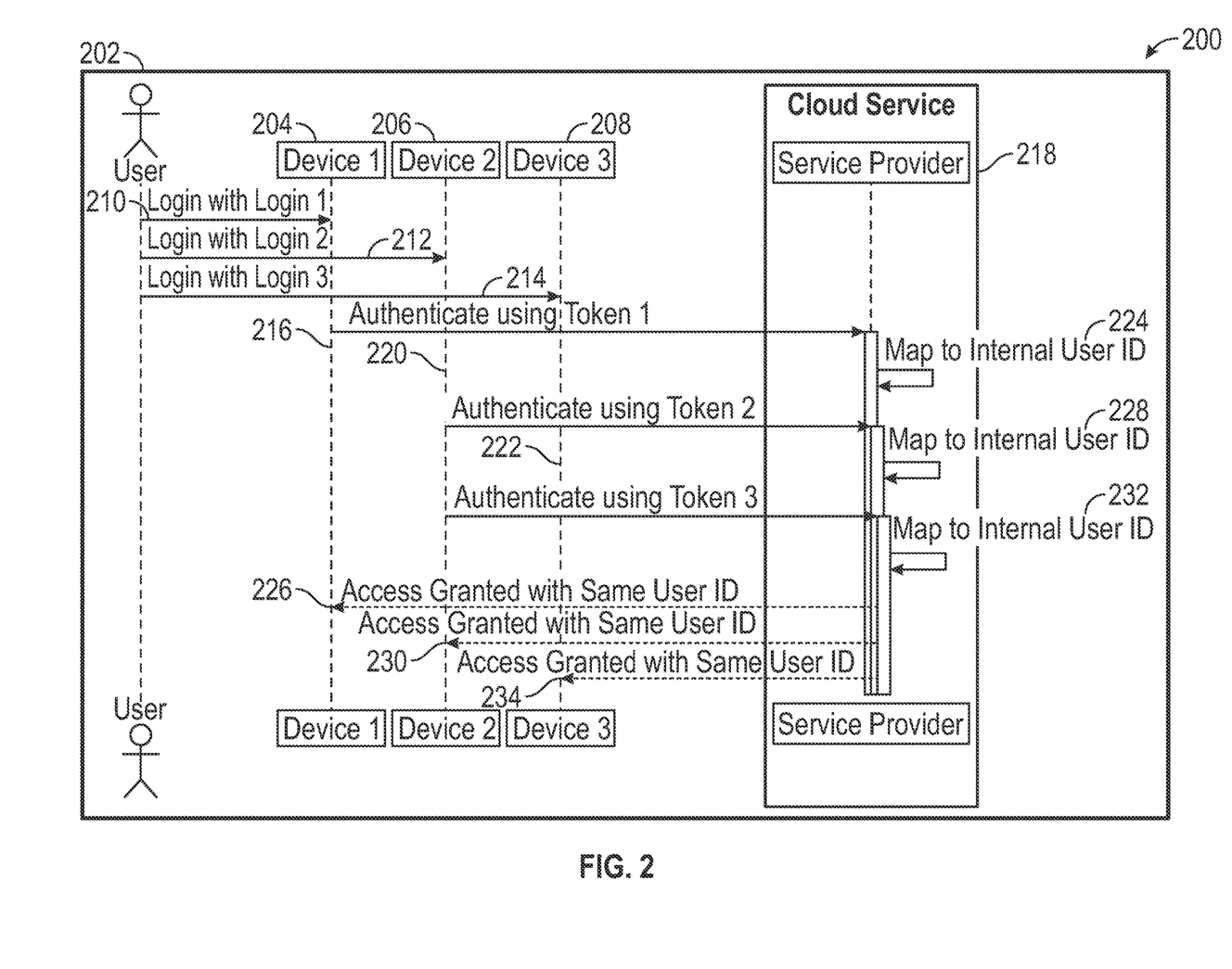
FIG. 2 illustrates a communication flow diagram according to example embodiments.

FIG. 2 illustrates a communication flow diagram 200 according to example embodiments. In an illustrated example, user 202 can use device 204, device 206, and device 208. Each device 204, 206, 208 can run various platforms and applications, and each platform can use different login information. For example, device 204 can require login information 210 for use of the device 204 (or for launching an application on the device 204 that requires use of credentials). Device 206 can require login information 212 for use of the device 206 (or for launching an application on the device 206 that requires use of credentials). Device 208 can require login information 214 for use of the device 208 (or for launching an application on the device 208 that requires use of credentials).

Device 204 can use the operating system (OS) executing on the device 204 to provide a token 216 (or other user credentials) to processing circuitry 218. Device 206 can use the OS executing on the device 206 to provide a token 220 (or other user credentials) to processing circuitry 218. Device 208 can use the OS executing on the device 208 to provide a token 222 (or other credentials) to processing circuitry 218. In one example embodiment of the method, the processing circuitry 218 can map the token 216 to a primary or main identity in operation 224. The processing circuitry 218 can provide the main or primary identity (or a primary token) in operation 226. Subsequent to this mapping according to operation 224, the user 202 can provide the primary token (using the operating system on device 204) to other devices including device 206 and device 208. Further, the user 202 can log in using any of his or her known identities and the processing circuitry 218 will map these identities to the primary identity to allow access to any services operating on devices 204, 206, 208.

Similarly, the processing circuitry 218 can map the token 220 to a primary or main identity in operation 228. The processing circuitry 218 can provide the main or primary identity (or a primary token) in operation 230. Subsequent to this mapping according to operation 228, the user can provide the primary token (using the operating system on device 206) to other devices including device 204 and device 208, or to use or log into any services operating on devices 204, 206, 208.

Still further, the processing circuitry 218 can map the token 222 to a primary or main identity in operation 232. The processing circuitry 218 can provide the main or primary identity (or primary token) in operation 234. Subsequent to this mapping according to operation 232, the user can provide the primary token (using the operating system on device 208) to other devices including device 204 and device 206, or to use or log into any services operating on devices 204, 206, 208. As can be appreciated, once the user 202 has a primary or main identity as provided by the processing circuitry 218, the user 202 can use or operate each of device 204, 206, 208 using a primary identity or primary token. The processing circuitry 218 provides secure tokens that can be exchanged between devices allowing the devices to seamlessly connect in one ecosystem even though the device/s 204, 206, 208 are operating with different operating systems/platforms. Furthermore, embodiments are not limited to three devices or three identities depicted in FIG. 2.

Subsequent to the operations shown in FIG. 2, the devices 204, 206, 208 can be operated from the same primary identity even though from the point of view of the user 202, the user 202 is logged into several different identities. Once a connection is made between devices 204, 206, 208, because of the way the token mechanism works, even if one of the passwords or other authentication information is changed on a device 204, 206, 2078 (or application executing thereon), internal mapping provided by processing circuitry 218 allows the user 202 to continue using all the devices without re-authenticating or logging in.

In some example methods, the user 202 may be asked (e.g., via a display associated with the processing circuitry 218) whether the user 202 already has a primary/main ID. If the user 202 responds in the affirmative, the user 202 is asked to connect (e.g., authenticate or log in). Otherwise, a new main/primary identity can be generated for the user 202 and stored/associated with the user 202.

Figure 3:
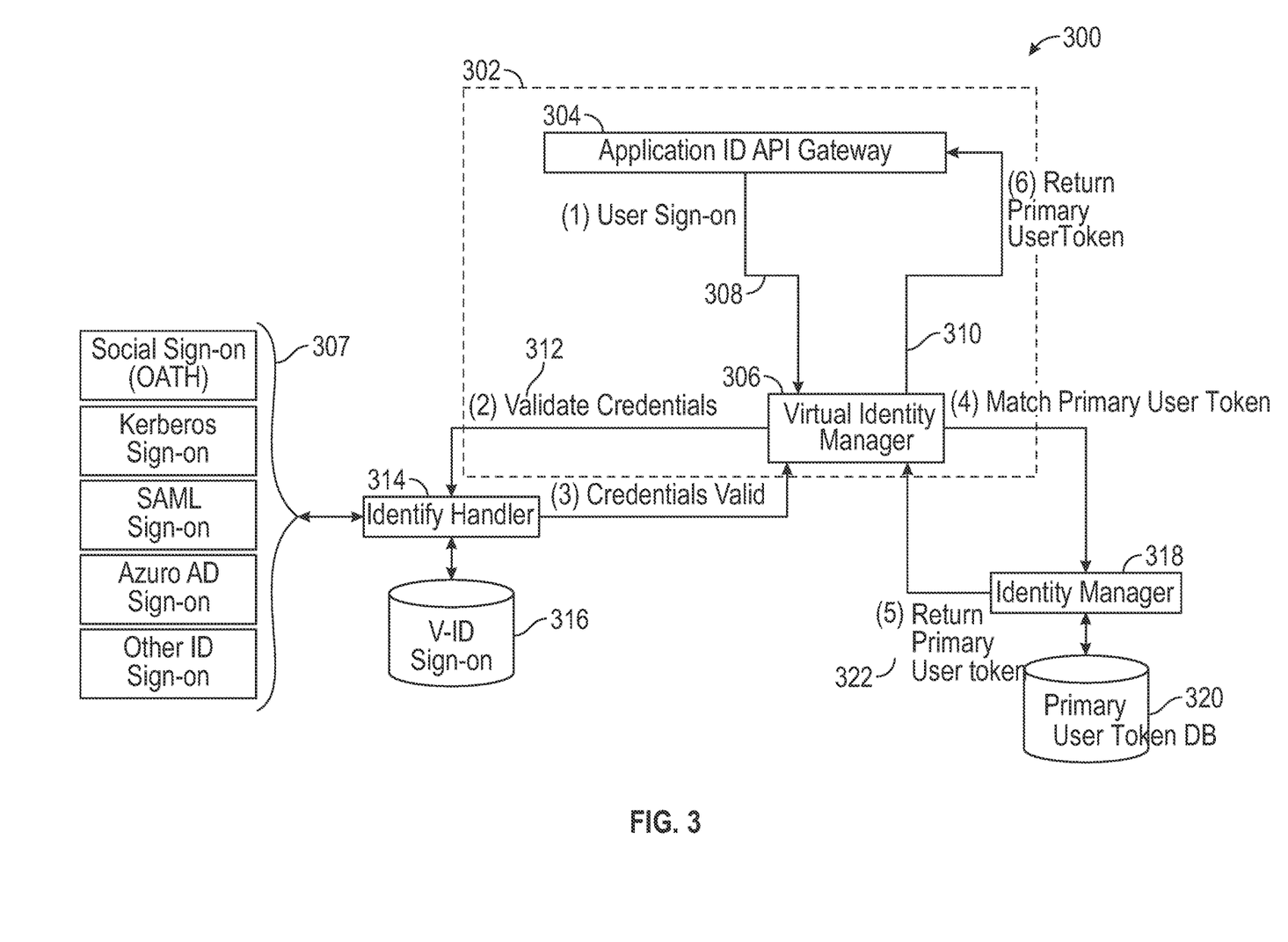
FIG. 3 illustrates a system architecture including an apparatus according to some embodiments.

FIG. 3 illustrates a system architecture 300 including an apparatus 302 according to some embodiments. The apparatus can include an interface 304 for receiving validation requests of a user (e.g., user 202 (FIG. 2)). The interface 304 can allow the user 202 to choose from two or more primary identities with which to interact with apparatuses and systems of embodiments as described below. For example, the interface 304 can provide user input controls to allow a user 202, by logging in from a first primary identity (e.g., JohnDoe@gmail.com) or a second primary identity (e.g., JohnDoe@yahoo.com), to select that identity for a current session. Future sessions can likewise be selected by logging in with the preferred identity. The interface 304 can comprise a web portal or other set of functionality or application for authorization of identity-based logins. The interface 304 can be based on various protocols 307 including Open Authorization (OAuth) protocols, Kerberos protocols, Security Assertion Markup Language (SAML) protocols, etc. Embodiments are not limited to the protocols shown. Rather, any protocol for performing authentication and login can be used and the interface 304 can include functionality for handling any or all session management protocols.

The interface 304 can include many different separate sets of interface/s or circuitry for handling various authentication protocols 307. Processing circuitry 306 can be coupled to the interface 304. As seen in FIG. 3, the different communication/s can be mapped to the user sign-on mechanism (e.g., a first validation request 308) that is provided to the processing circuitry 306. The first validation request 308 can include a first virtual identity. The first virtual identity (and any subsequent provided virtual identities described later herein) can correspond to login information of the user 202 within a first application (e.g., applications as described with reference to FIG. 2).

The processing circuitry 306 can detect protocol information of the validation requests and perform validation based on the detected protocol. To perform this validation, the processing circuitry 306 can generate communication 312. Communication 312 can include credentials (e.g., first virtual identity), and communication 312 can be provided to the identity handler circuitry 314. The identity handler circuitry 314 can validate these credentials using the protocol that corresponds to the credentials (e.g., as provided by the interface 304). Handshake mechanisms, etc. (based on the appropriate protocol) are executed to validate credentials at block 316 and a handoff is made to a virtual identity manager to determine whether credentials correspond to a known user.

The processing circuitry 306 can generate a primary token based on the first virtual identity by using the identity manager 318 to map this virtual identity to a primary token. The identity manager 318 can retrieve the primary token from the database 320 and this primary token can be returned to the processing circuitry at communication 322. The primary token can carry the identity of whichever account the corresponding user 202 signed in with at the application level. In examples, the primary token can carry an identity associated with the user 202 selection made with the interface 304 as described above, e.g., the primary token can carry the identity JohnDoe@gmail.com or JohnDoe@yahoo.com as selected by the user 202. The database 320 can store the primary token/s such that they are associated with the first virtual identity and any subsequent virtual identities provided by the user 202. The database 320 can accordingly comprise a relational database or database table for maintaining relationships of identities to users, among other relationships.

The processing circuitry 306 can return this primary token to the interface 304 at communication 310. With the primary token, user 202 can perform any activities as described with respect to FIG. 2. In examples, the processing circuitry 306 can detect whether the primary token is expired and generate a new primary token responsive to detecting that the primary token is expired. The time frame for expiration can be based on the security level of the application, device, or protocol used, or the activity that the user 202 is performing.

Responsive to receiving subsequent validation requests of the user subsequent to the first validation request, the processing circuitry 306 can provide the primary token upon validating that the subsequent validation requests correspond to the user 202.

Figure 4:
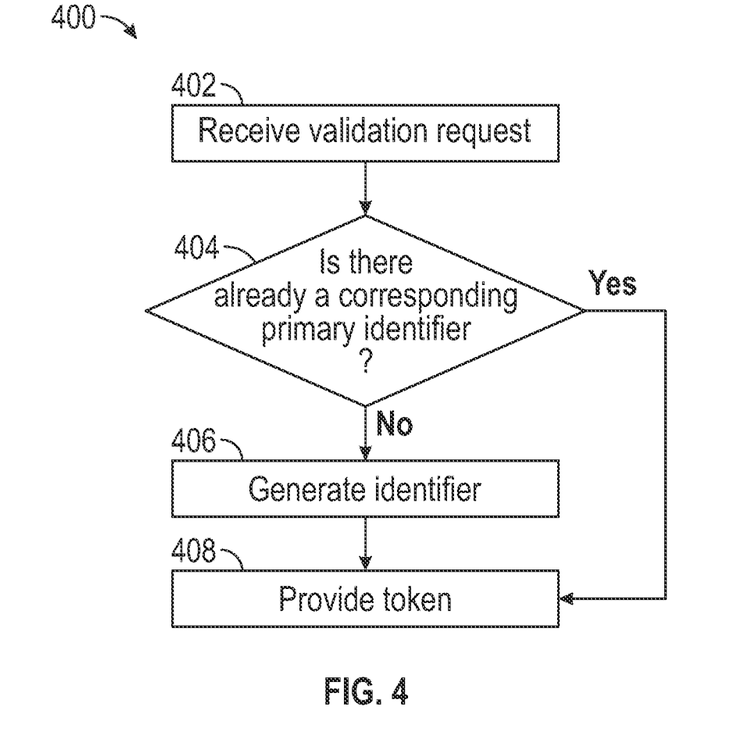
FIG. 4 is a flowchart of a method according to some embodiments.

FIG. 4 is a flowchart of a method 400 according to some embodiments. The method 400 can be implemented by processing circuitry 306 (FIG. 2) or other components shown in FIG. 2 or FIG. 3.

The method 400 can begin with operation 402 with the processing circuitry receiving a validation request that includes a virtual identity of a user 202. At operation 404, the processing circuitry 306 can determine whether there is already a corresponding primary token for the user 202, using for example relational database queries on the database 320. At operation 406, if there is not already a primary token corresponding the user 202 (or one of his or her virtual identities as described earlier herein), the processing circuitry 306 can generate a primary token according to methods described above with reference to FIG. 2-3. At operation 408, the primary token is provided back to the user 202 (using, for example, communication 310 (FIG. 3)).

Figure 5:
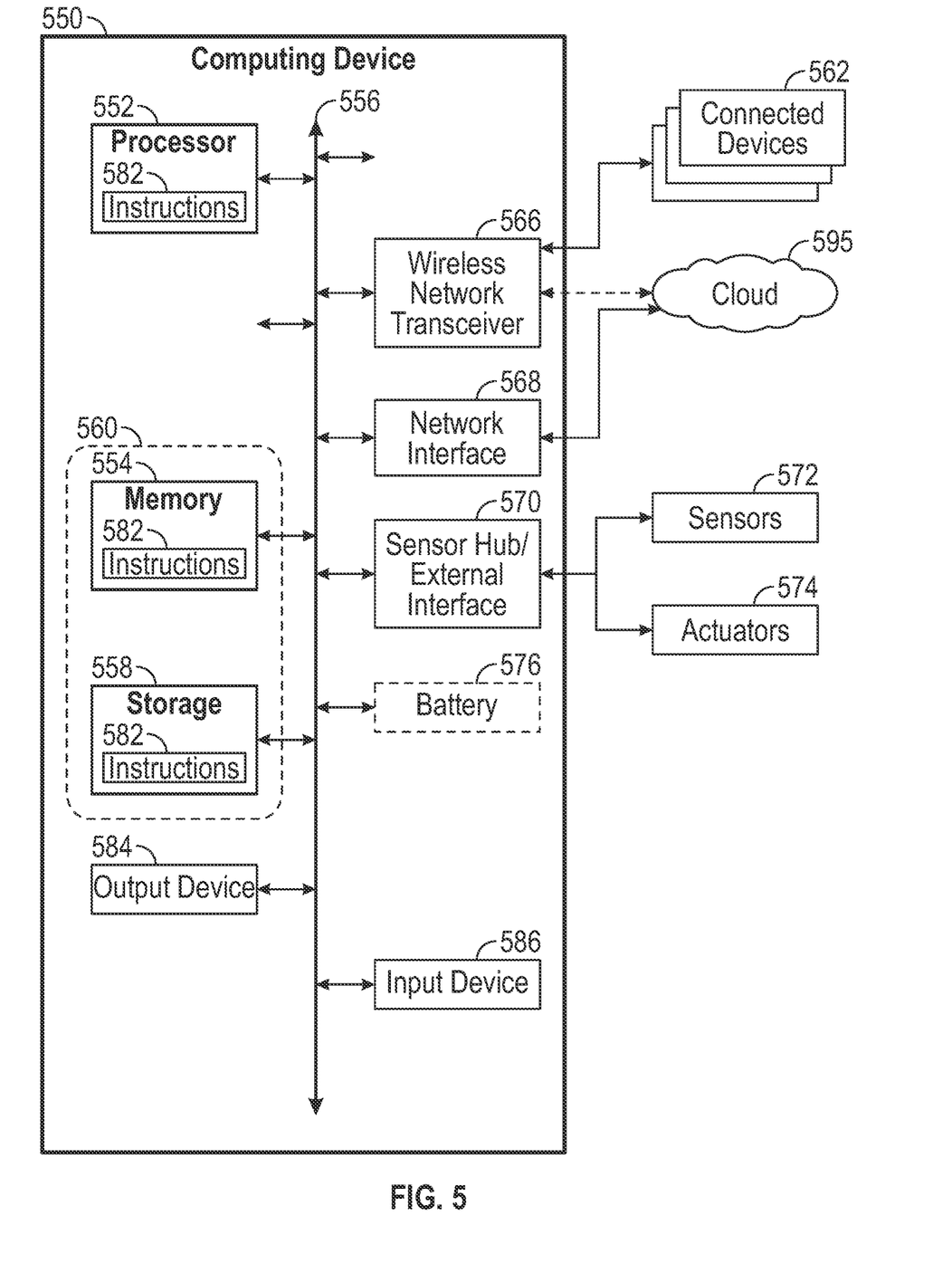
FIG. 5 provides a detailed overview of example components within a computing device in a computing system.

FIG. 5 provides a detailed overview of example components within a computing device 550 in a computing system. Computing device 550 may be embodied as a type of device, appliance, computer, or other "thing" capable of communicating with other Edge, networking, or endpoint components. For example, a computing device 550 may be embodied as a personal computer, server, smartphone, a mobile computing device, a smart appliance, an in-vehicle compute system (e.g., a navigation system), a self-contained device having an outer case, shell, etc., or other device or system capable of performing the described functions. The computing device 550 can perform operations for authenticating a user, using a plurality of user identities, and mapping the plurality of user identities to a primary token as described above with reference to FIG. 2-4.

This computing device 550 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing device 550, or as components otherwise incorporated within a chassis of a larger system.

The instructions 582 on the processor 552 (separately, or in combination with the instructions 582 of the machine readable medium 560) may configure execution or operation of a centralized authorization apparatus (e.g., apparatus 302) that maps multiple user identities to one primary identity and one primary token that can enable user activities on multiple devices executing disparate or same operating systems.

The computing device 550 described above can include other components for performing operations in accordance with example embodiments. The computing device 550 may include processing circuitry in the form of a processor 552, which may be a microprocessor, a multi-core processor, a multithreaded processor, an ultra-low voltage processor, an embedded processor, an xPU/DPU/IPU/NPU, special purpose processing unit, specialized processing unit, or other known processing elements.

The processor 552 may communicate with a system memory 554 over an interconnect 556 (e.g., a bus). Any number of memory devices may be used to provide for a given amount of system memory. To provide for persistent storage of information such as data, applications, operating systems and so forth, a storage 558 may also couple to the processor 552 via the interconnect 556. The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies.

The interconnect 556 may couple the processor 552 to a transceiver 566, for communications with the connected Edge devices 562 or with other devices (e.g., the different devices described with reference to FIG. 1 and FIG. 2, which can execute different operating systems or same operating systems, within a homogeneous or heterogeneous ecosystem). The transceiver 566 may use any number of frequencies and protocols. The wireless network transceiver 566 (or multiple transceivers) may communicate using multiple standards or radios for communications at a different range. For example, the computing device 550 may communicate with close devices, e.g., within about 10 meters, using a local transceiver based on Bluetooth Low Energy (BLE), or another low power radio, to save power. More distant connected Edge devices 562, e.g., within about 50 meters, may be reached over ZigBee® or other intermediate power radios.

A wireless network transceiver 566 (e.g., a radio transceiver) may be included to communicate with devices or services in a cloud (e.g., an Edge cloud 595) via local or wide area network protocols. Given the variety of types of applicable communications from the device to another component or network, applicable communications circuitry used by the device may include or be embodied by any one or more of components 566, 568, or 570. Accordingly, in various examples, applicable means for communicating (e.g., receiving, transmitting, etc.) may be embodied by such communications circuitry.

Sensors 572 can include cameras or other imaging systems for performing user operations. Actuators 574 can include motor controls or other controls of any computing systems or devices that may be included as described in FIG. 1. A battery 576 can provide power when the computing device 550 is not "plugged in" to an electrical outlet. Output device 584 can include displays, and input device 586 can include keyboards, mice, etc. In examples, output device 584 and input device 586 can request and receive user 202 input for example entry of authentication information.

In an example, the instructions 582 provided via the memory 554, the storage 558, or the processor 552 may be embodied as a non-transitory, machine-readable medium 560 including code to direct the processor 552 to perform electronic operations in the computing device 550. The processor 552 may access the non-transitory, machine-readable medium 560 over the interconnect 556. For instance, the non-transitory, machine-readable medium 560 may be embodied by devices described for the storage 558 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 560 may include instructions to direct the processor 552 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

While the illustrated examples of FIG. 5 include example components for a compute node and a computing device, respectively, examples disclosed herein are not limited thereto. As used herein, a "computer" may include some or all of the example components of FIG. 5 in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIG. 5, each of which may include different sub-components, different memory capacities, I/O capabilities, etc. For example, because some implementations of distributed networking and/or distributed computing are associated with particular desired functionality, examples disclosed herein include different combinations of components illustrated in FIG. 5 to satisfy functional objectives of distributed computing tasks. In some examples, one or more objective functions of a distributed computing task(s) rely on one or more alternate devices/structure located in different parts of an Edge networking environment, such as devices to accommodate data storage.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus including:
   an interface for receiving validation requests of a user; and
   processing circuitry coupled to the interface, the processing circuitry configured to:
   receive a first validation request, the first validation request including a first virtual identity;
   provide, over the interface, a primary token responsive to validating the first virtual identity; and
   responsive to receiving subsequent validation requests of the user subsequent to the first validation request, provide the primary token upon validating that the subsequent validation requests correspond to the user.

2. The apparatus of claim 1, wherein the first virtual identity corresponds to login information of the user within a first application or device.

3. The apparatus of claim 2, wherein subsequent validation requests are received from other applications or devices than the first application or device.

4. The apparatus of claim 1, wherein the processing circuitry is configured to detect protocol information of the validation requests and to perform validation based on the detected protocol.

5. The apparatus of claim 4, wherein the detected protocol includes one of Open Authorization (OAuth) protocol, a Kerberos protocol, or a Security Assertion Markup Language (SAML) protocol.

6. The apparatus of claim 4, wherein the processing circuitry is configured to detect whether the primary token is expired and to generate a new primary token responsive to detecting that the primary token is expired.

7. The apparatus of claim 6, wherein expiration is determined based on a security level of an application or device associated with the request.

8. The apparatus of claim 1, further comprising a storage device, and wherein the processing circuitry is configured to:
   store the primary token and an associated first virtual identity; and
   store subsequent virtual identities that have been validated to the user such that the first virtual identity and subsequent virtual identities are mapped to the primary token.

9. The apparatus of claim 1, wherein the interface is configured to receive validation requests from a plurality of different devices associated with the user.

10. The apparatus of claim 1, further comprising:
    a user display and a user input device, and wherein the processing circuitry is configured to:
    generate a request for the user to select a primary identity by logging into the primary identity;
    request user input regarding whether the user has login information for the selected primary identity; and
    receive a response to the request for user input, the response including one of a negative response or login credentials for the selected primary identity.

11. A computer-readable medium including instructions that, when executed on processing circuitry cause the processing circuitry to perform operations including:
    receiving a first validation request, the first validation request including a first virtual identity of a user;
    providing a primary token responsive to validating the first virtual identity;
    responsive to receiving subsequent validation requests of the user subsequent to the first validation request, providing the primary token upon validating that the subsequent validation requests correspond to the user;
    storing the primary token and an associated first virtual identity; and
    storing subsequent virtual identities that have been validated to the user such that the first virtual identity and subsequent virtual identities are mapped to the primary token.

12. The computer-readable medium of claim 11, wherein the first virtual identity corresponds to login information of the user within a first application or device.

13. The computer-readable medium of claim 12, wherein subsequent validation requests are received from other applications or devices than the first application or device.

14. The computer-readable medium of claim 11, wherein the operations further comprise:
   detecting protocol information of the validation requests; and
   performing validation based on the detected protocol.

15. The computer-readable medium of claim 14, wherein the detected protocol includes one of Open Authorization (OAuth) protocol, a Kerberos protocol, or a Security Assertion Markup Language (SAML) protocol.

16. The computer-readable medium of claim 14, wherein the operations further comprise:
   detecting whether the primary token is expired and generating a new primary token responsive to detecting that the primary token is expired.

17. The computer-readable medium of claim 16, wherein expiration is determined based on a security level of an application or device associated with the request.

18. The computer-readable medium of claim 11, wherein the operations further comprise:
   storing the primary token and an associated first virtual identity; and
   storing subsequent virtual identities that have been validated to the user such that the first virtual identity and subsequent virtual identities are mapped to the primary token.

19. A method comprising:
   receiving a first validation request, the first validation request including a first virtual identity of a user;
   detecting a protocol associated with the first validation request;
   selecting a validation routine based on the protocol;
   providing a primary token responsive to validating the first virtual identity using the validation routine; and
   responsive to receiving subsequent validation requests of the user subsequent to the first validation request, providing the primary token upon validating that the subsequent validation requests correspond to the user.

20. The method of claim 19, further comprising:
   generating a request for the user to select a primary identity by logging into the primary identity;
   requesting user input regarding whether the user has login information for the selected primary identity; and
   receiving a response to the request for user input, the response including one of a negative response or login credentials for the selected primary identity.

* * * * *